UNITED STATES PATENT OFFICE.

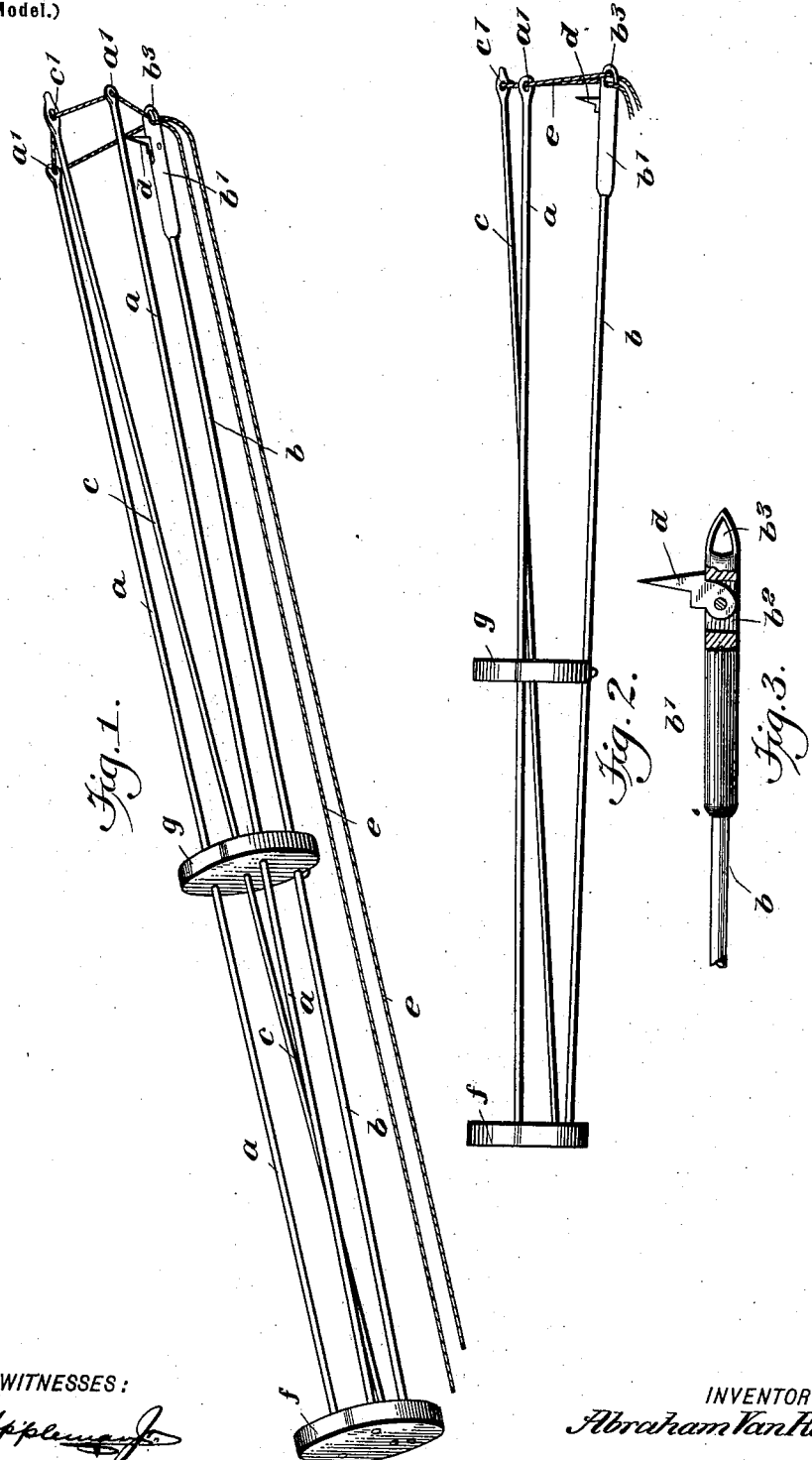

ABRAHAM VAN ROEKEL, OF SIOUX CENTER, IOWA.

VETERINARY INSTRUMENT.

SPECIFICATION forming part of Letters Patent No. 685,192, dated October 22, 1901.

Application filed March 2, 1901. Serial No. 49,585. (No model.)

*To all whom it may concern:*

Be it known that I, ABRAHAM VAN ROEKEL, a citizen of the United States, and a resident of Sioux Center, in the county of Sioux and State of Iowa, have invented a new and Improved Veterinary Instrument, of which the following is a full, clear, and exact description.

This invention relates to an apparatus for delivering animals in labor, and it is particularly adapted for use with sows.

The invention comprises a number of peculiarly-arranged finger-like rods adapted to be introduced into the vagina of the animal and to lie around the muzzle of the fetus. One of these rods carries a prong having pivotal connection with it to swing with a limited movement, and a cord or the like is passed around the ends of the rods, so that when the muzzle of the fetus is properly inclosed by drawing on the cord the rods are engaged firmly therewith and the prong is caused to enter the skin of the fetus. The fetus being thus firmly grasped, it may readily be drawn out of the vagina as the animal labors.

This specification is a specific description of one form of the invention, while the claims are definitions of the actual scope thereof.

Reference is to be had to the accompanying drawings, forming a part of this specification, in which similar characters of reference indicate corresponding parts in all the figures.

Figure 1 is a perspective view of the invention. Fig. 2 is a side elevation thereof, and Fig. 3 is a detail view of the prong.

The before-mentioned finger-like rods are here shown to be four in number. In the drawings two are lettered $a$, one $b$, and one $c$. These rods are preferably formed of steel plated with nickel. The rods $a$ are formed with eyes $a'$ in their working ends, and the rod $b$ has at its working end an enlargement $b'$, formed with a cavity $b^2$ and an eye $b^3$. In the cavity $b^2$ is pivoted the prong $d$, which has a shoulder bearing against the enlargement $c'$ to limit the outward movement of the prong to the position shown in Fig. 3. The prong is, however, free to swing inward, so as to lie against the enlargement $b'$ of the rod and at an inclination thereto. The rod $c$ is formed with an eye $c'$, and through these several eyes is rove a cord $e$, the two parts of which are crossed in the eye $b^3$ and the ends of which are led back to the outer or handle end of the instrument. The cord is formed of cotton, hemp, or linen.

The various rods $a$, $b$, and $c$ are held in proper position by two blocks or spaces $f$ and $g$, formed of wood or iron. The block $f$ is located at the rear extremities of the rods and has the rods fastened securely thereto, the three rods $a$ and $b$ being arranged in triangular relation to each other. The block $g$ is placed about midway the rods and has the rods passed loosely through it, said rods still retaining their triangular disposition. Now it is clear that by grasping the rods $a$ and $b$ between the blocks $f$ and $g$ and pressing them together their front or working ends will be forced apart. These rods $a$ and $b$ are constructed of spring material, so that they will retain their form and return to their normal position when the pressure above mentioned is relaxed.

The rod $c$ is arranged diagonally with respect to the other rods, as best shown in Fig. 2, and the part of the rod between the blocks $f$ and $g$ lies wholly within the triangle described by the rods $a$ and $b$, and the front or working part of the rod $c$ projects outside of the said triangle. This rod is held by the blocks $f$ and $g$ in other respects the same as the rods $a$ and $b$. Now it will be apparent that when the rods $a$ and $b$ are grasped to spread the working ends the rod $c$ is not affected, but retains its position with respect to the blocks $f$ and $g$, while the ends of the rods $a$ and $b$ spread or contract, as may be.

In using the device the parts are disposed as in Fig. 1, and the front end of the instrument is introduced into the vagina of the animal. When the fetus is reached, the ends of the finger-rods are expanded and passed over the muzzle of the fetus, and the ends of the cord $e$ are then drawn upon to contract the rods around the muzzle and to force the prong $d$ through the skin, so as firmly to grasp the fetus. Preferably the instrument should be manipulated to engage the prong with the under jaw of the fetus just back of the bone, and thus not only will a firm hold be attained, but a very slight wound will be inflicted from which the animal readily will recover.

Having thus described my invention, I claim as new and desire to secure by Letters Patent—

1. A veterinary instrument having resilient finger-like rods adapted to engage the fetus at their front ends, and spacers or blocks to which said rods are secured, the spacers or blocks being immovable relatively to the rods, one of the blocks being arranged at the rear portions of the rods and the other at an intermediate point, to permit operating the rods by grasping them at a point between the blocks.

2. A veterinary instrument having resilient finger-like rods adapted to engage the fetus at their front ends, spacers or blocks to which said rods are secured, one of the blocks being arranged at the rear portions of the rods and the other at an intermediate point, to permit operating the rods by grasping them at a point between the blocks, and an additional rod held by the blocks and disposed diagonally of the first-named rods, for the purpose specified.

In testimony whereof I have signed my name to this specification in the presence of two subscribing witnesses.

ABRAHAM VAN ROEKEL.

Witnesses:
   JOS. HYINK,
   T. PRINS.